US011191682B2

(12) United States Patent
Saito

(10) Patent No.: US 11,191,682 B2
(45) Date of Patent: Dec. 7, 2021

(54) SINGLE-HANDEDLY OPERABLE WHEELCHAIR

(71) Applicant: RESEARCH INSTITUTE FOR LIFE SPACE, LLC, Sapporo (JP)

(72) Inventor: Toru Saito, Sapporo (JP)

(73) Assignee: RESEARCH INSTITUTE FOR LIFE SPACE, LLC

( * ) Notice: Subject to any disclaimer, the term of this patent is extended or adjusted under 35 U.S.C. 154(b) by 162 days.

(21) Appl. No.: 16/819,177

(22) Filed: Mar. 16, 2020

(65) Prior Publication Data

US 2020/0214915 A1  Jul. 9, 2020

Related U.S. Application Data

(63) Continuation of application No. PCT/JP2018/010428, filed on Mar. 16, 2018.

(30) Foreign Application Priority Data

Sep. 26, 2017  (JP) .............................. JP2017-184433

(51) Int. Cl.
*A61G 5/02* (2006.01)
*F16H 7/06* (2006.01)
(Continued)

(52) U.S. Cl.
CPC ............. *A61G 5/021* (2013.01); *A61G 5/026* (2013.01); *F16H 7/06* (2013.01); *F16H 48/08* (2013.01); *F16H 48/10* (2013.01)

(58) Field of Classification Search
CPC .......... A61G 5/021; A61G 5/026; F16H 7/06; F16H 48/08; F16H 48/10
(Continued)

(56) References Cited

U.S. PATENT DOCUMENTS

2009/0039612 A1* 2/2009 Bidwell .................. A61G 5/08
                                                           280/250.1
2009/0045002 A1   2/2009 Riemslag et al.
2015/0202101 A1* 7/2015 Louis ..................... A61G 5/028
                                                           280/250.1

FOREIGN PATENT DOCUMENTS

JP  S46-13386 U  5/1971
JP  H10-174700 A  6/1998
(Continued)

OTHER PUBLICATIONS

International Search Report for PCT/JP2018/010428 dated May 15, 2018.

*Primary Examiner* — Minnah L Seoh
*Assistant Examiner* — Felicia L. Brittman
(74) *Attorney, Agent, or Firm* — Yokoi & Co., U.S.A.; Toshiyuki Yokoi

(57) ABSTRACT

Provided is a wheelchair that can be easily operated with either a right or left hand. The wheelchair according to the present invention is provided with: a right-left pair of first handrims connected to handrim spokes; a right-left pair of second handrims connected to spokes; a first rotary shaft for transmitting a first rotational force generated by rotation of the left first handrim to a right wheel; and a second rotary shaft for transmitting a second rotational force generated by rotation of the right first handrim to a left wheel, wherein a first power transmission device on a right inner shaft of a right drive mechanism meshes with a second power transmission device on the second rotary shaft, and a third power transmission device on a right outer shaft of the right drive mechanism meshes with a fourth power transmission device on the first rotary shaft.

8 Claims, 16 Drawing Sheets

(51) Int. Cl.
*F16H 48/08* (2006.01)
*F16H 48/10* (2012.01)

(58) Field of Classification Search
USPC .......................................................... 280/214
See application file for complete search history.

(56) References Cited

FOREIGN PATENT DOCUMENTS

| | | |
|---|---|---|
| JP | 2003-033403 A | 2/2003 |
| JP | 2004-141452 A | 5/2004 |
| JP | 2009-515644 A | 4/2009 |
| JP | 2010-279666 A | 12/2010 |
| JP | 5105256 B | 12/2012 |
| JP | 2014-221138 A | 11/2014 |

* cited by examiner

SINGLE-HANDEDLY OPERABLE WHEELCHAIR

CROSS-REFERENCES TO RELATED APPLICATIONS

This application claims the benefit of priority and is a Continuation application of the prior International Patent Application No. PCT/JP2018/010428, with an international filing date of Mar. 16, 2018, which designated the United States, and is related to the Japanese Patent Application No. 2017-184433, filed Sep. 26, 2017, the entire disclosures of all applications are expressly incorporated by reference in their entirety herein.

BACKGROUND OF THE INVENTION

1. Field of the Invention

The present invention generally relates to a manual wheelchair (hereinafter, simply referred to as a "wheelchair"). More specifically, the present invention relates to a wheelchair that can be easily operated by either a right or left hand.

2. Description of Related Art

A wheelchair is basically configured so that a wheelchair user (hereinafter, simply referred to as a "user") operates right and left wheels by his/her own hand to move forward, backward, right turn, left turn. However, it is difficult for a person with a disability in either of the right or left side of the body to use a general wheelchair, because they cannot use both hands freely. Therefore, a single-hand-operated wheelchair that can be operated with only a healthy hand, even if the right or left body is disabled, has been proposed (see Patent Document 1). The wheelchair described in Patent Document 1 is configured such that the wheelchair disposes a double handrim outside a wheel on a side, where a healthy half of the body of a user is located, so that the movement of the wheelchair can be controlled by operating the handrim with the healthy hand.

On the other hand, a wheelchair has also been proposed in which a rotary shaft connecting right and left wheels and an operating device such as a lever and a clutch are interlocked, and these operating devices are operated by single hand to control the wheelchair as desired (see Patent Documents 2 to 4).

Patent Document 1: Japanese Examined Utility Model Application Publication No. 46-13386
Patent Document 2: Japanese Unexamined Patent Application Publication No. 2004-141452
Patent Document 3: Japanese Unexamined Patent Application Publication No. 2010-279666
Patent Document 4: Japanese Patent No. 5105256

BRIEF SUMMARY OF THE INVENTION

However, the wheelchair described in Patent Document 1 is not convenient for wheelchair users, because handrim for operation is disposed on only one side of the right and left sides, and the operable side is predetermined. For this reason, there is an issue that two types of the operation, both right and left, have to be manufactured, which contributes to high cost. In addition, the wheelchair described in Patent Document 2 requires operation of a lever, and the wheelchair described in Patent Document 3 requires a user to tilt his/her body to the right or left during operation, which is a physical burden. There was an issue that it was overweight. Furthermore, the wheelchair described in Patent Document 4 has an issue that the configuration corresponding to the constant speed movement is not shown, and the usability is not good. Therefore, there is a demand for a wheelchair that can be easily operated by a healthy hand for a person with a disability in either of the right or left side of the body.

The present invention has been developed in view of such a situation, and an objective of the present invention is to provide a wheelchair that can be easily operated by either a right or left hand.

The present invention provides a wheelchair having a frame, a right wheel and a left wheel, a right caster and a left caster, and a seat, including: a right-left pair of first handrims concentrically disposed with an axle of each wheel and respectively connected to handrim spokes; a right-left pair of second handrims respectively connected to spokes of each wheel, concentrically disposed with the axle of each wheel, and having a larger diameter than the first handrim; a first rotary shaft for transmitting a first rotational force generated by rotation of the left first handrim to the right wheel via right and left drive mechanisms; and a second rotary shaft for transmitting a second rotational force generated by rotation of the right first handrim to the left wheel via the right and left drive mechanisms. The right and left drive mechanisms have a right-left pair of inner shafts connected to the handrim spokes and rotatably supported on the axle, and a right-left pair of outer shafts connected to the spokes of each wheel and rotatably supported on the inner shaft, a first power transmission device provided on the right inner shaft meshes with a second power transmission device provided on the right side of the second rotary shaft, a third power transmission device provided on the right outer shaft meshes with a fourth power transmission device provided on the right side of the first rotary shaft, a fifth power transmission device provided on the left inner shaft meshes with a sixth power transmission device provided on the left side of the first rotary shaft, a seventh power transmission device provided on the left outer shaft meshes with an eighth power transmission device provided on the left side of the second rotary shaft, the first rotational force is transmitted from the left inner shaft to the right wheel via the first rotary shaft, and the second rotational force is transmitted from the right inner shaft to the left wheel via the second rotary shaft.

Further, the present invention provides a wheelchair having a frame, a right wheel and a left wheel, a right caster and a left caster, and a seat, including: a right-left pair of first handrims concentrically disposed with an axle of each wheel and respectively connected to handrim spokes; a right-left pair of second handrims respectively connected to spokes of each wheel, concentrically disposed with the axle of each wheel, and having a larger diameter than the first handrim; a first rotary shaft for transmitting a first rotational force generated by rotation of the left first handrim to the right wheel via right and left drive mechanisms; and a second rotary shaft for transmitting a second rotational force generated by rotation of the right first handrim to the left wheel via the right and left drive mechanisms. The right and left drive mechanisms have a cylindrical shaft support housing mounted to the frame so as to be concentric with the center of the axle, a right-left pair of inner shafts connected to the handrim spokes and rotatably supported by bearings disposed on the inner surface of the shaft support housing, and a right-left pair of outer shafts connected to the spokes of each wheel and rotatably supported by bearings disposed on the outer surface of the shaft support housing, a first power transmission device provided on the right inner shaft meshes with a second power transmission device provided on the right side of the second rotary shaft, a third power transmission device provided on the right outer shaft meshes with a fourth power transmission device provided on the right side of the first rotary shaft, a fifth power transmission device provided on the left inner shaft meshes with a sixth power transmission device provided on the left side of the first rotary shaft, a seventh power transmission device provided on the left outer shaft meshes with an eighth power transmission device provided on the left side of the second rotary shaft, the first rotational force is transmitted from the left inner shaft to the right wheel via the first rotary shaft, and the second rotational force is transmitted from the right inner shaft to the left wheel via the second rotary shaft.

In an embodiment of the present invention, the center line of the left first handrim and the center line of the left second handrim are disposed on the same plane, and the center line of the right first handrim and the center line of the right second handrim are disposed on the same plane.

In another embodiment of the present invention, each of the power transmission devices is either a spur gear, a roller chain and a sprocket, or a toothed pulley and a toothed belt.

In still another embodiment of the present invention, each of the power transmission devices is a bevel gear.

According to the embodiment of the wheelchair of the present invention, the first and second handrims having the same function on the right and left sides are equipped. Therefore, it is convenient for the user, and an additional effect is that the wheelchair manufacturer only needs to manufacture one kind of wheelchair. Further, by adopting the drive mechanisms using the shaft support housing, a smoother feeling when in operation can be obtained. In addition, by adopting a configuration in which the center lines of the first handrim and the second handrim are disposed on the same plane, it is possible to change grasping of the first handrim and the second handrim without removing the hand from the handrim during operation. Furthermore, the wheelchair of the present invention can also be applied to a sports-wheelchair with a camber angle on the wheel.

The wheelchair of the present invention can even be used by anyone other than a person with a disability in either of the right or left side of the body. That is, the wheelchair of the present invention is useful when a person who has healthy both hands moves in the wheelchair with an article (smartphone, tableware, umbrella, or the like) in single hand. It is also useful when playing sports such as tennis or basketball in the wheelchair. Further, as will be described in detail later, the wheelchair of the present invention is useful compared to a conventional both-hands-operated wheelchair, in that it can be used for uphill moving while resting according to the physical strength of the user.

DETAILED DESCRIPTION OF THE INVENTION

Figure 1:
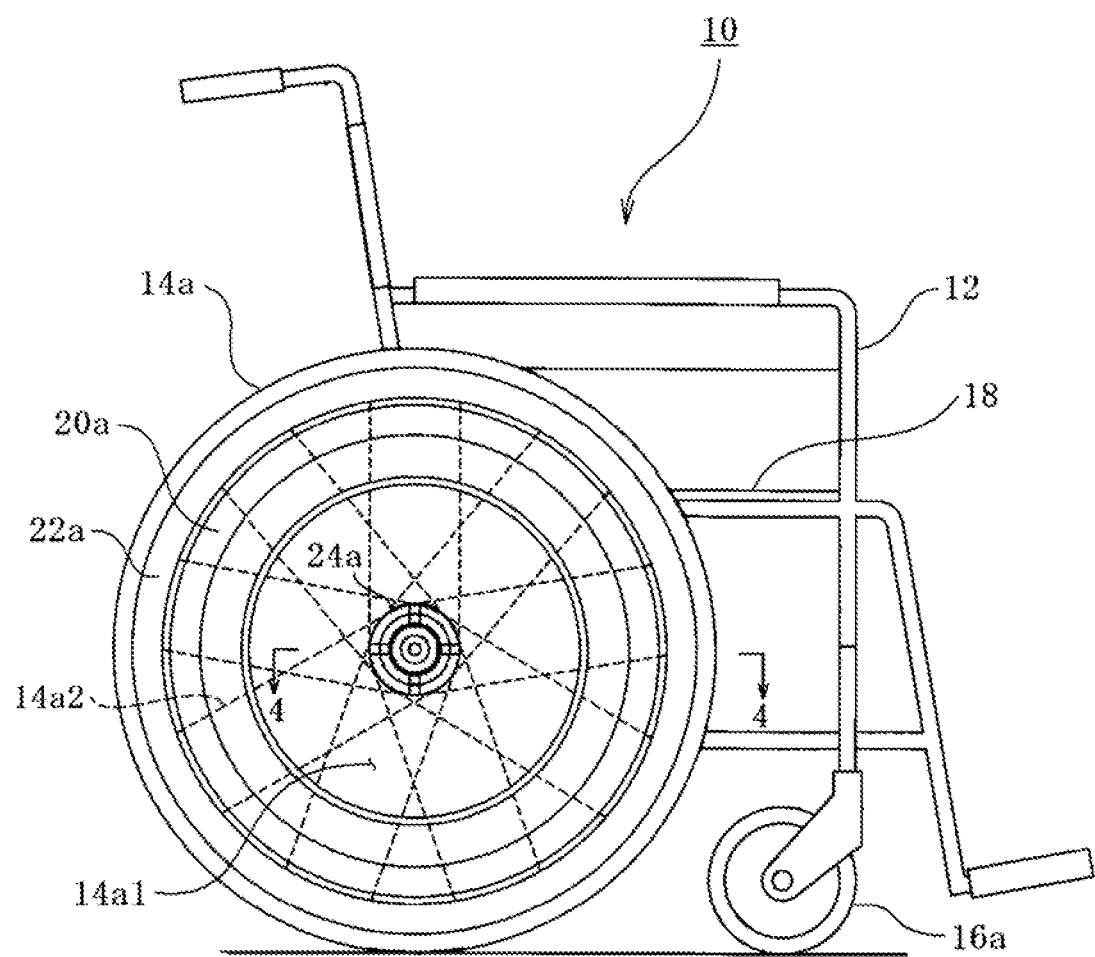
FIG. 1 is a right side view showing a wheelchair, according to an embodiment of the present invention.
Figure 2A:
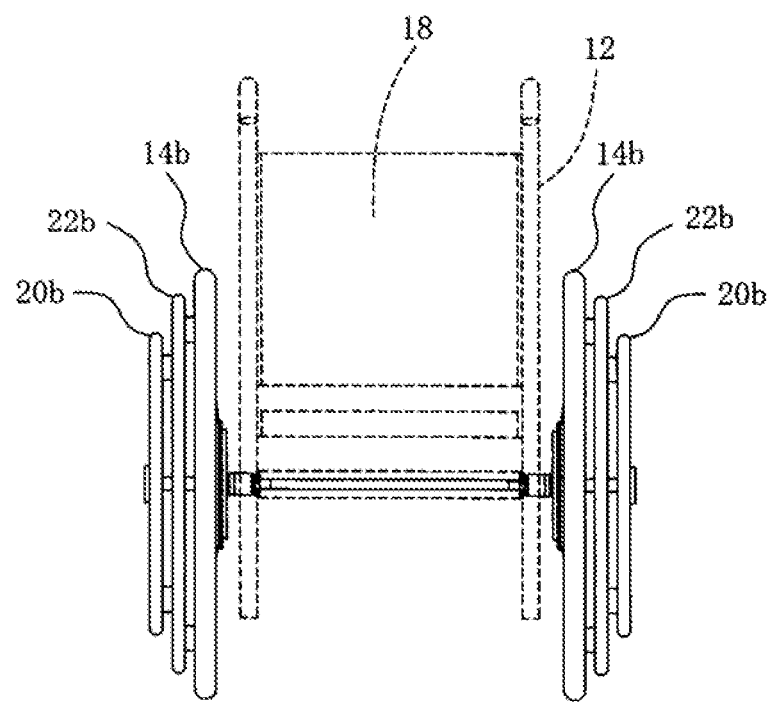
FIG. 2A is a rear view of the wheelchair of FIG. 1.
Figure 2B:
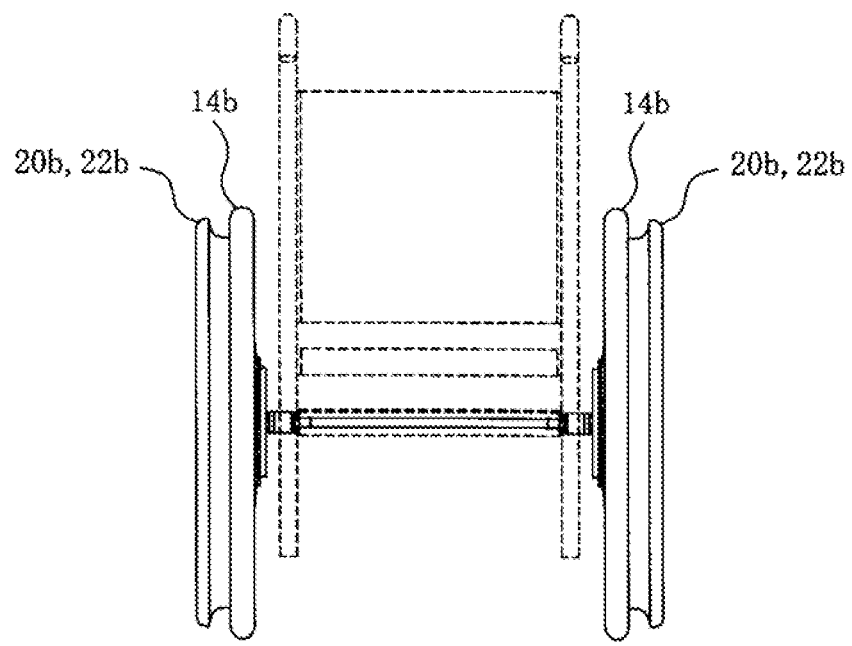
FIG. 2B is a rear view of another form of a wheelchair.

Next, a wheelchair, according to an embodiment of the present invention, will be described in detail with reference to the drawings. FIG. 1 is a right side view showing the wheelchair, according to the embodiment of the present invention. FIG. 2A is a rear view of the wheelchair of FIG. 1, and FIG. 2B is a rear view of a wheelchair in another form of FIG. 1.

According to the embodiment of the present invention as shown by a reference numeral 10 as a whole in FIG. 1, the wheelchair has a frame 12 forming a skeleton of the wheelchair, a right wheel 14a and a left wheel 14b, a pair of casters 16a and 16b, and a seat 18. Wheel covers 14a1 and 14b1 are respectively attached to the outside of the right wheel 14a and the left wheel 14b, so that fingers are not caught between spokes of each wheel. The wheelchair 10 is basically symmetrical with respect to its center line, and has a same component on each of the right and left sides. In the following description, "a" is attached to the reference symbol of the component located on the right side of the wheelchair 10, and "b" is attached to the reference symbol of the component located on the left side of the wheelchair 10.

The wheelchair 10 also has a first handrim 20a disposed concentrically with an axle 24a of the right wheel 14a, and a second handrim 22a disposed concentrically with the axle 24a of the right wheel 14a and having a larger diameter than the first handrim 20a. The second handrim 22a is connected to spokes 14a2 of the right wheel 14a via a rim holding a tire, and the first handrim 20a is connected to handrim spokes 20a2 which will be described later in detail.

In the form shown in FIG. 2A, the center line of the first handrim 20a and the center line of the second handrim 22a are offset (that is, in the order of the right wheel 14a, the second handrim 22a, and the first handrim 20a from the inward to the outward). But as shown in FIG. 2B, the center line of the first handrim 20a and the center line of the second handrim 22a may be disposed on the same plane. The form shown in FIG. 2B is more preferable for the user, because it is possible to change grasping of the first handrim 20a and the second handrim 22a without removing the hand from the handrim during operation.

Figure 3A:
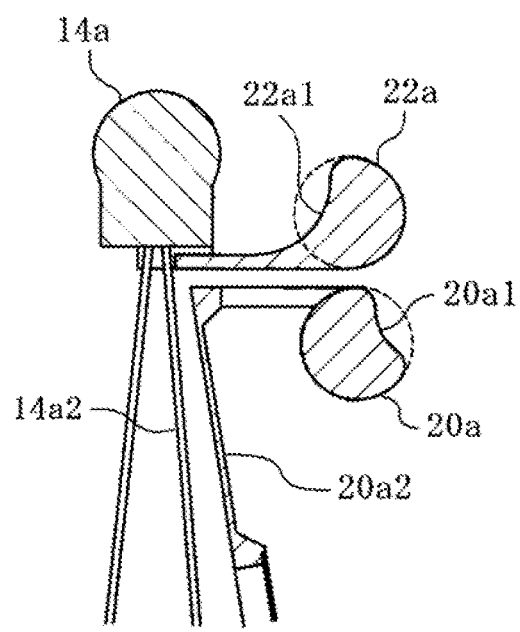
FIG. 3A is a view showing a cross section of a first handrim and a second handrim.
Figure 3B:
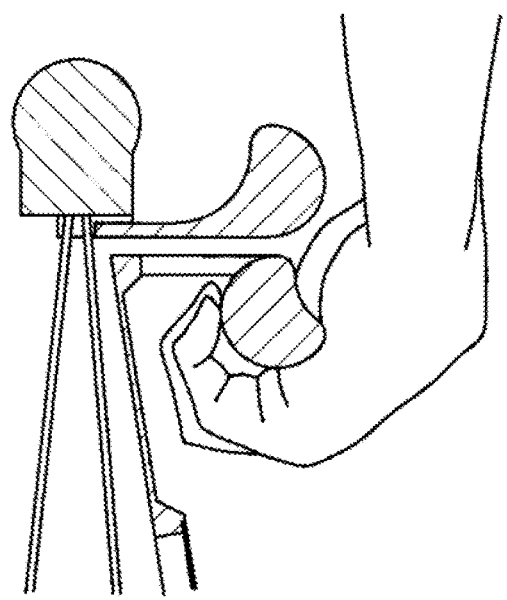
FIG. 3B is a view showing a state in which the first handrim is grasped by a right hand.
Figure 3C:
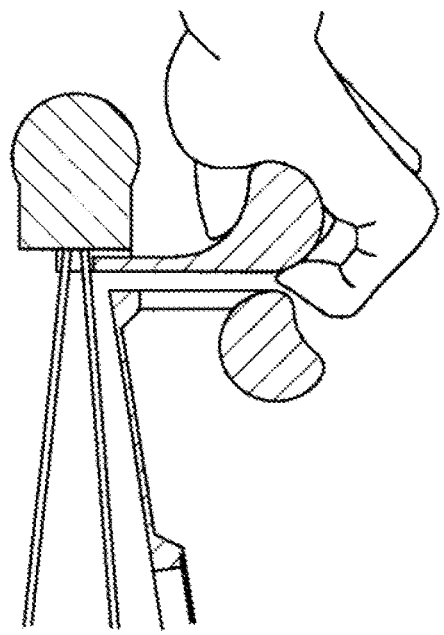
FIG. 3C is a view showing a state in which the second handrim is grasped by the right hand.
Figure 3D:
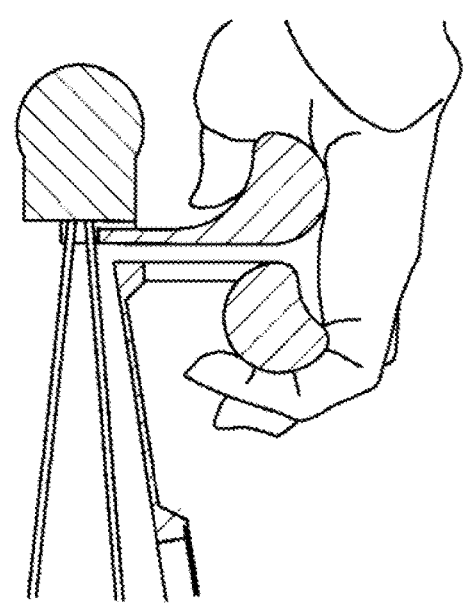
FIG. 3D is a view showing a state in which both the first handrim and the second handrim are grasped by the right hand.

Preferably, as shown in FIG. 3A, the first handrim 20a shown in FIG. 2B is provided with a recess 20a1 at an outward upper portion of a circular cross section, and the second handrim 22a is provided with a recess 22a1 at an inward upper portion of a circular cross section. Thereby, when the user grasps the first handrim 20a and the second handrim 22a, the fingers fit into the recesses 20a1 and 22a1, so that a good operation feeling can be obtained. FIG. 3B shows a state in which the first handrim 20a is grasped by the right hand, FIG. 3C shows a state in which the second handrim 22a is grasped by the right hand, and FIG. 3D shows a state in which both the first handrim 20a and the second handrim 22a are grasped by the right hand. In the specification, "inward" means a side where a user sitting in the wheelchair is located, and "outward" means an opposite side to the side where the user is located.

Figure 4:
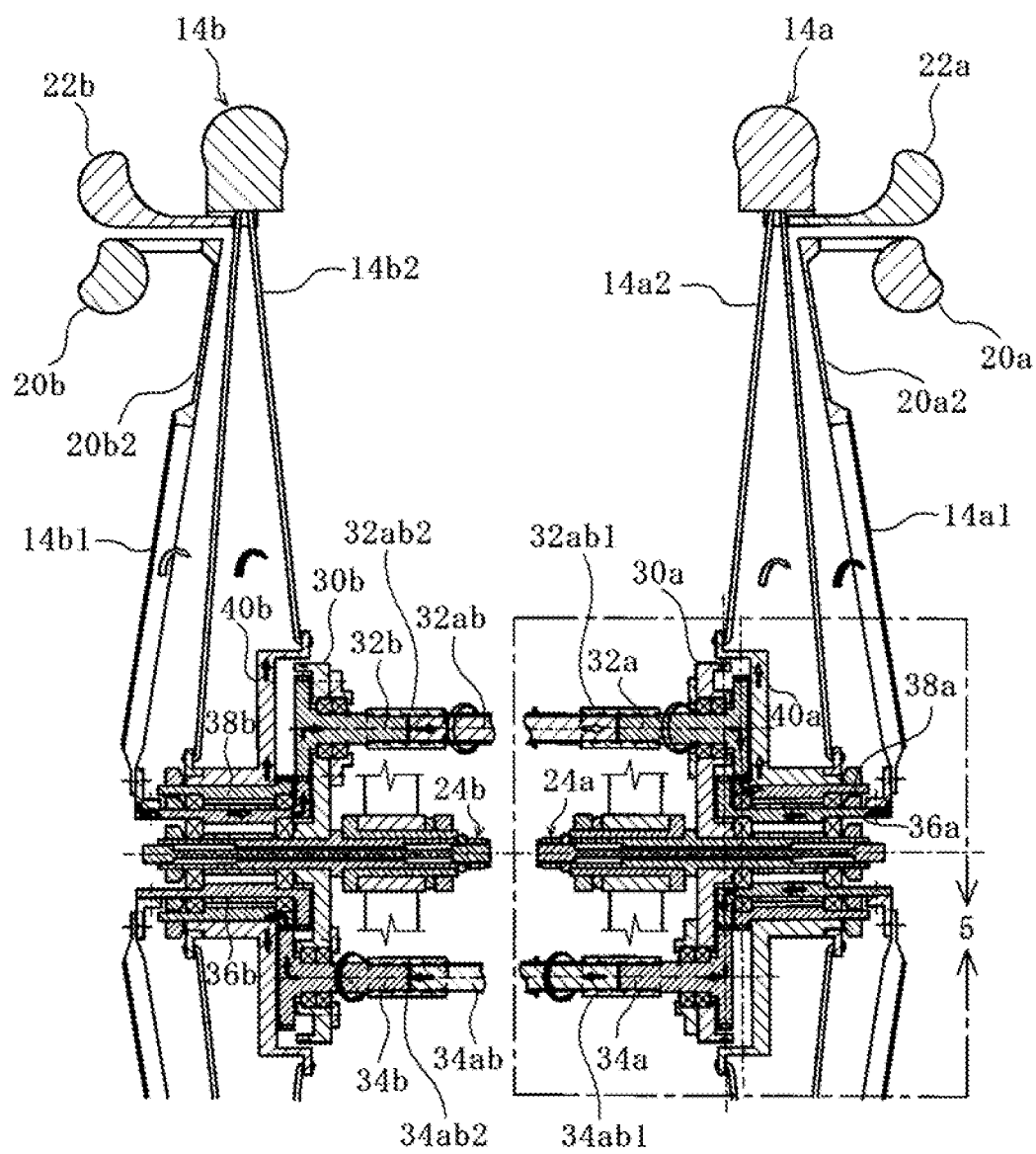
FIG. 4 is a cross-sectional view taken along line 4-4 of FIG. 1, showing a configuration of right and left drive mechanisms of the wheelchair.
Figure 5:
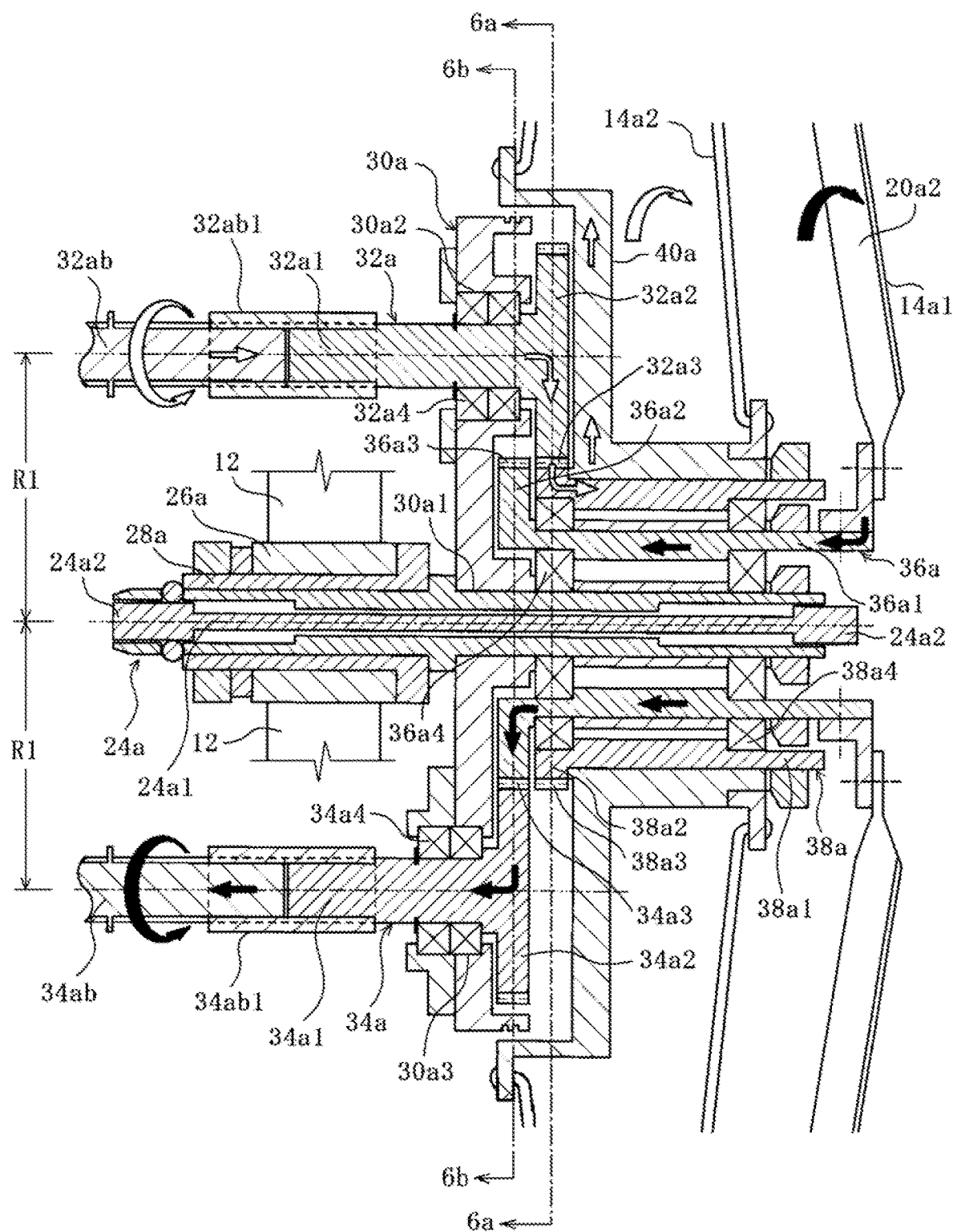
FIG. 5 is an enlarged cross-sectional view of a portion of 5 in FIG. 4.
Figure 6A:
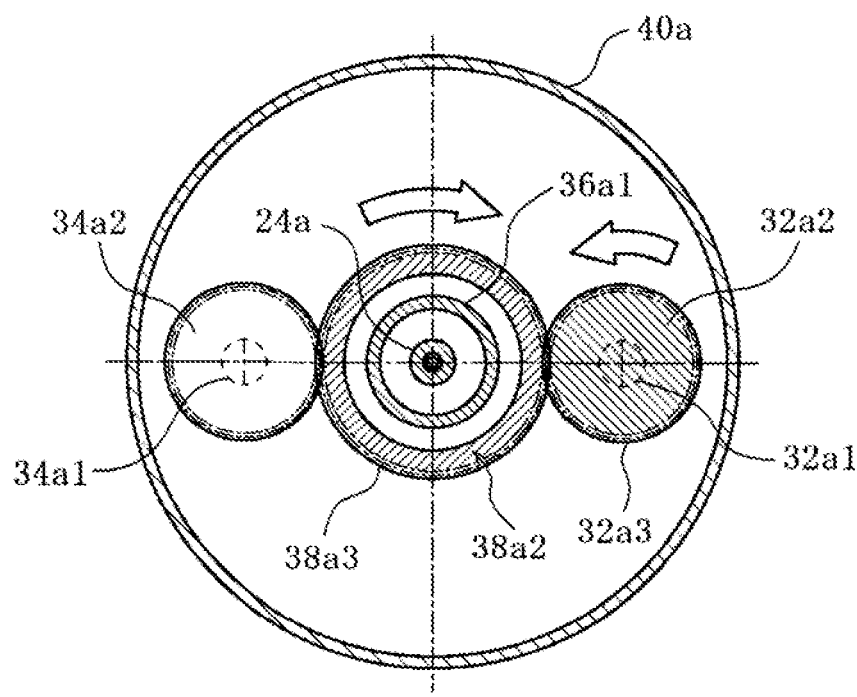
FIG. 6A is a cross-sectional view taken along line 6a-6a in FIG. 5.
Figure 6B:
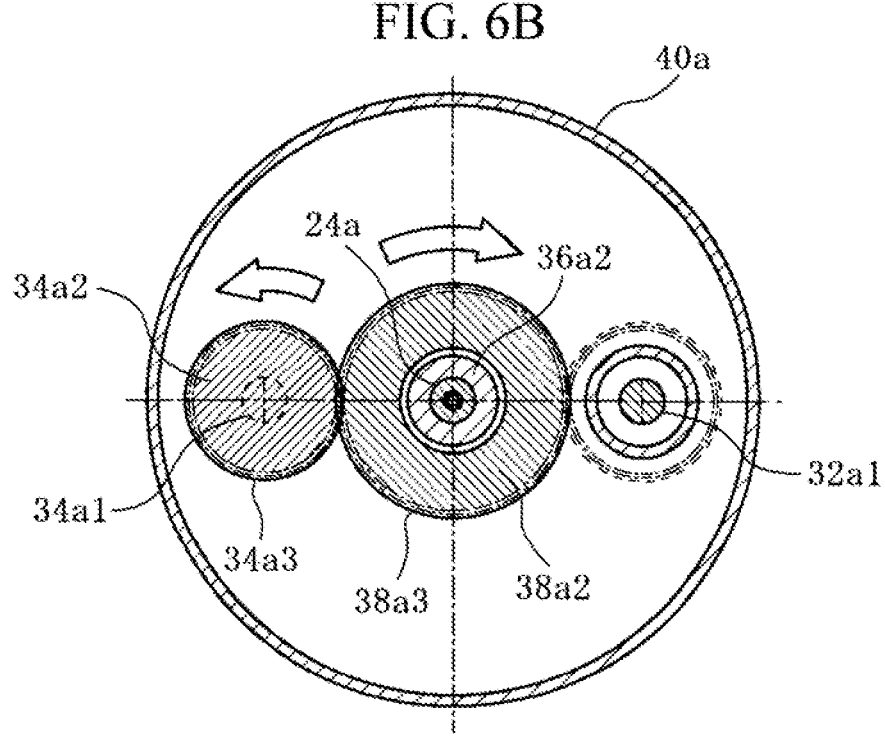
FIG. 6B is a cross-sectional view taken along line 6b-6b in FIG. 5.

Next, a configuration of right and left drive mechanisms of the wheelchair 10 will be described mainly with reference to FIGS. 4 to 6. FIG. 4 is a cross-sectional view taken along line 4-4 in FIG. 1. The right and left drive mechanisms are in point symmetry to a midpoint of a line connecting the right axle 24a and a left axle 24b. FIG. 5 is an enlarged cross-sectional view of a portion of 5 in FIG. 4, showing a configuration of the right drive mechanism. The right drive mechanism is disposed inside a wheel hub 40a, and includes an inner shaft 36a, an outer shaft 38a, a first rotatory shaft 32a, a second rotatory shaft 34a, and a first to a fourth power transmission devices (36a3, 34a3, 38a3, and 32a3). FIG. 6A is a cross-sectional view taken along line 6a-6a in FIG. 5, and FIG. 6B is a cross-sectional view taken along line 6b-6b in FIG. 5. The wheelchair 10 includes the axle 24a that supports the right wheel 14a, and the axle 24a is mounted to the frame 12 via a mounting boss 26a and a mounting sleeve 28a. An opening 30a1 is provided at the center of a circular disk 30a, and the axle 24a is fitted into the opening 30a1.

Figure 7A:
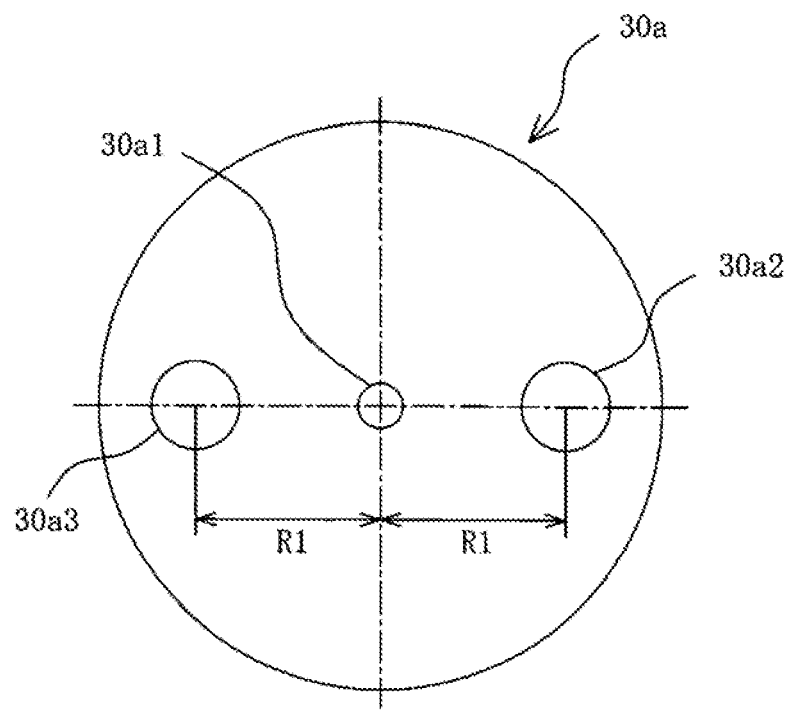
FIG. 7A is a view showing a position of an opening of a disk.
Figure 7B:
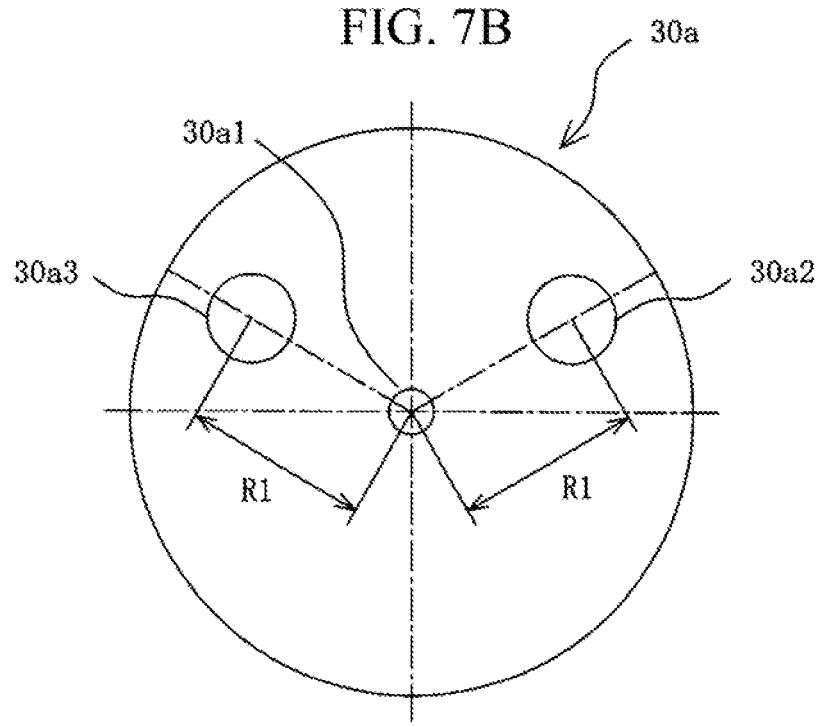
FIG. 7B is a view showing a modified form of a position of an opening of the disk.
Figure 8A:
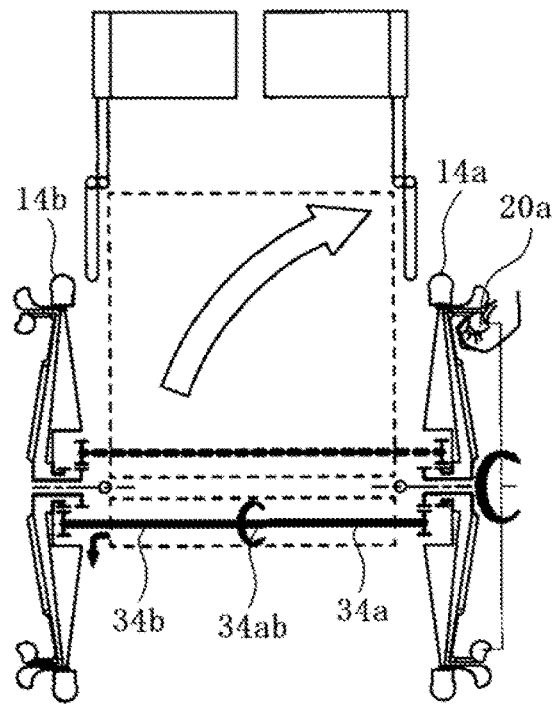
FIGS. 8A, 8B, 8C, and 8D are schematic views for explanation of the operating state of the wheelchair.
Figure 8B:
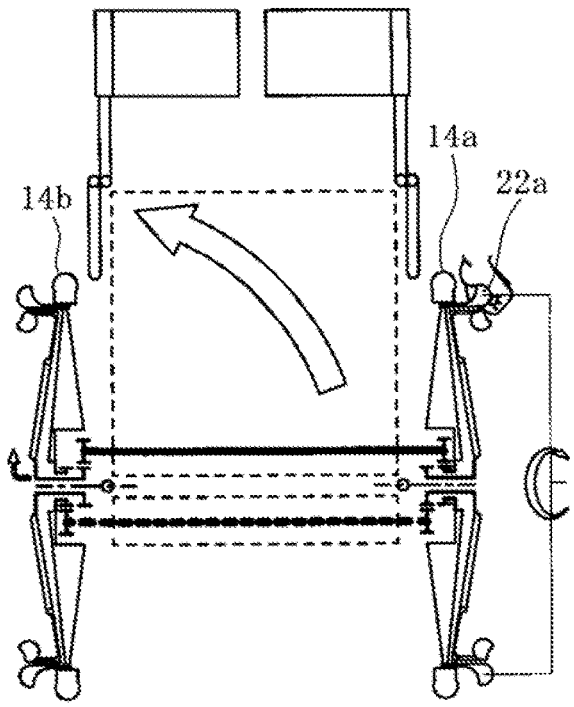
Figure 8C:
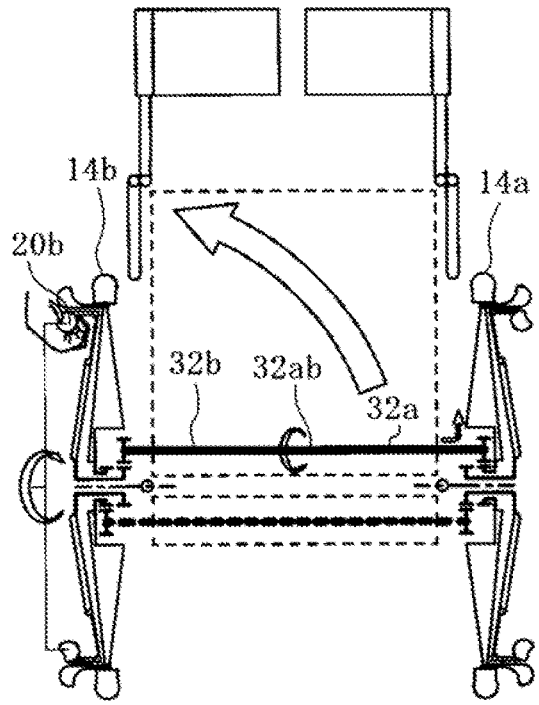
Figure 8D:
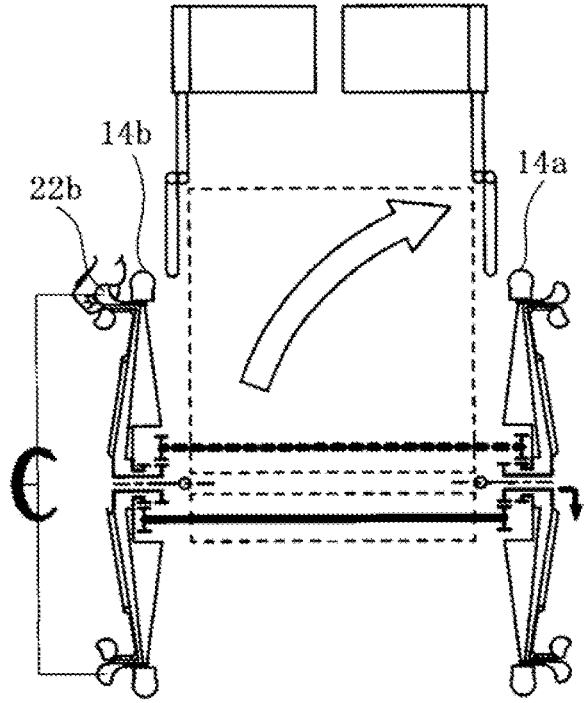

The disk 30a is provided with openings 30a2 and 30a3 on a circumference of a radius R1 concentric with the center of the disk 30a. Thereof, a first rotary shaft 32a and a second rotary shaft 34a are respectively rotatably supported in the openings 30a2 and 30a3. In the form shown in FIGS. 6A and 6B, the openings 30a2 and 30a3 of the disk 30a are provided on a line whose center passes through the diameter (see FIG. 7A). As shown in FIG. 7B, the centers of the openings 30a2 and 30a3 may not be provided on the diameter line.

The first rotary shaft 32a has a columnar shaft portion 32a1 and a disk 32a2 provided at the outer end of the shaft portion 32a1. The fourth power transmission device (spur gear in the example shown) 32a3 is provided on the outer periphery of the disk 32a2. The shaft portion 32a1 is rotatably supported in the opening 30a2 by bearings 32a4. In addition, the left side portion of the wheelchair 10 is also provided with a first rotary shaft 32b having a same configuration at a corresponding location. The right first rotary shaft 32a and the left first rotary shaft 32b form one rotary shaft via a columnar shaft portion 32ab and connection sleeves 32ab1, 32ab2.

The second rotary shaft 34a has a columnar shaft portion 34a1 and a disk 34a2 provided at the outer end of the shaft portion 34a1, similarly to the first rotary shaft 32a. The second power transmission device (spur gear in the example shown) 34a3 is provided on the outer periphery of the disk 34a2. The shaft portion 34a1 is rotatably supported in the opening 30a3 by bearings 34a4. In addition, the left side portion of the wheelchair 10 is also provided with a second rotary shaft 34b having a same configuration at a corresponding location. The second rotary shaft 34a and the second rotary shaft 34b form one rotary shaft via a columnar shaft portion 34ab and connection sleeves 34ab1, 34ab2.

In FIG. 4, for convenience of drawing, the shaft portion 32ab and the shaft portion 34ab are shown as being right and left separated. But in actuality, the shaft portion 32ab and the shaft portion 34ab are each formed by one columnar shaft. Further, the shaft portions 32a1, 32ab and the first rotary shaft 32b may be integrally formed. Similarly, the shaft portions 34a1, 34ab and the second rotary shaft 34b may be integrally formed.

The inner shaft 36a is rotatably supported on the axle 24a. The inner shaft 36a has a cylindrical shaft portion 36a1 and a disk 36a2. The disk 36a2 is provided at the inner end of the shaft portion 36a1. The first power transmission device (spur gear in the example shown) 36a3 is provided on the outer periphery of the disk 36a2, and meshes with the second power transmission device (spur gear) 34a3 of the disk 34a2 of the second rotary shaft 34a. The shaft portion 36a1 is rotatably supported on the axle 24a by bearings 36a4. The inner shaft 36a is connected to the handrim spokes 20a2, and the second rotary shaft 34a is rotated via the handrim spokes 20a2 and the inner shaft 36a by rotation of the first handrim 20a. That is, a second rotational force generated by rotation of the right first handrim 20a is transmitted from the right inner shaft 36a to the left wheel 14b via the second rotary shaft 34a.

The outer shaft 38a is rotatably supported on the inner shaft 36a. The outer shaft 38a has a cylindrical shaft portion 38a1 and a disk 38a2. The disk 38a2 is provided at the inner end of the shaft portion 38a1. The third power transmission device (spur gear in the example shown) 38a3 is provided on the outer periphery of the disk 38a2, and meshes with the fourth power transmission device (spur gear) 32a3 of the disk 32a2 of the first rotary shaft 32a. The shaft portion 38a1 is rotatably supported on the inner shaft 36a by bearings 38a4. The wheel hub 40a is fixed to the outer periphery of the outer shaft 38a, and the wheel hub 40a is connected to the spokes 14a2 of the right wheel 14a. The right wheel 14a is rotated by rotation of the second handrim 22a.

In FIGS. 4 and 5, a black arrow and a white arrow indicate a power transmission path. That is, the black arrow indicates that the second rotational force generated by rotation of the right first handrim 20a is transmitted to the second rotary shaft 34a, via the handrim spokes 20a2 and the inner shaft 36a, and then transmitted to the left wheel 14b, via the shaft portion 34ab, the second rotary shaft 34b, the outer shaft 38b, and the wheel hub 40b. On the other hand, the white arrow indicates that a first rotational force generated by rotation of a left first handrim 20b is transmitted to the first rotary shaft 32b, via handrim spokes 20b2 and an inner shaft 36b, and then transmitted to the right wheel 14a, via the shaft portion 32ab, the first rotary shaft 32a, the outer shaft 38a, and the wheel hub 40a.

In FIGS. 4 and 5, the axle 24a is hollow, and a rod 24a1 provided with a raised portion 24a2 at both ends is inserted. The rod 24a1 is for releasably mounting the wheel 14a to the frame 12. Such the configuration itself of the axle 24a is known and is not configured in the subject matter of the present invention.

Although a spur gear is used as each of the power transmission devices in the above embodiment, other power transmission devices (for example, a roller chain and a sprocket, a toothed pulley and a toothed belt) may be used.

In the above description, the configuration of the right side portion of the wheelchair 10 has been mainly described, but the left side portion of the wheelchair 10 has substantially the same configuration as the right side portion. That is, when describing the main components, 20b represents a first handrim, 22b represents a second handrim, 24b represents an axle, 30b represents a disk, 32b represents a first rotary shaft, 34b represents a second rotary shaft, 36b represents an inner shaft, 38b represents an outer shaft, and 40b represents a wheel hub.

In the configuration of the left side portion of FIG. 4, the left inner shaft 36b is rotatably supported on the axle 24b. A fifth power transmission device (spur gear in the example shown) is provided on the left inner shaft 36b, and meshes with a sixth power transmission device (spur gear) provided on the left side of the first rotary shaft 32b. The inner shaft 36b is connected to the handrim spokes 20b2, and the first rotary shaft 32b is rotated via the handrim spokes 20b2 and the inner shaft 36b by rotation of the first handrim 20b. That is, the first rotational force generated by rotation of the left first handrim 20b is transmitted from the left inner shaft 36b to the right wheel 14a via the first rotary shaft 32b.

The outer shaft 38b is rotatably supported on the inner shaft 36b. A seventh power transmission device (spur gear in the example shown) is provided on the left outer shaft 38b, and meshes with an eighth power transmission device (spur gear) provided on the left side of the second rotary shaft 34b. The wheel hub 40b is fixed to the outer periphery of the outer shaft 38b, and is connected to the spokes 14b2 of the left wheel 14b. The left wheel 14b is rotated by rotation of a second handrim 22b.

Figure 9A:
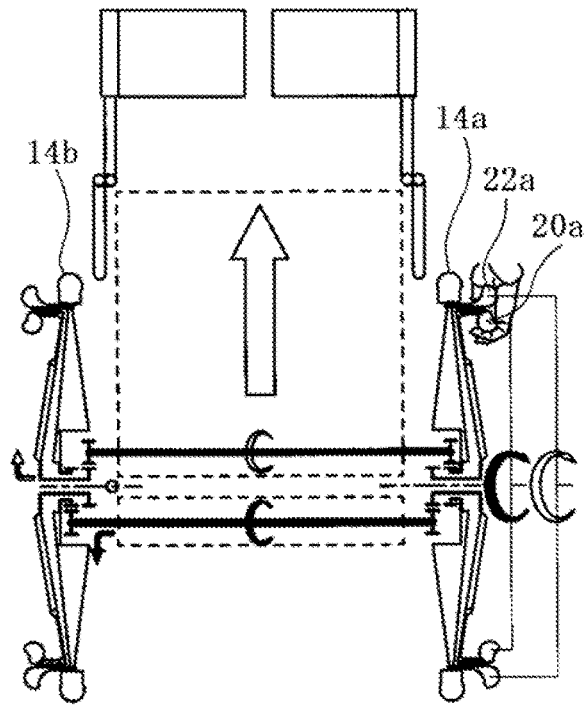
FIGS. 9A, 9B, and 9C are other schematic views for explanation of the operating state of the wheelchair.
Figure 9B:
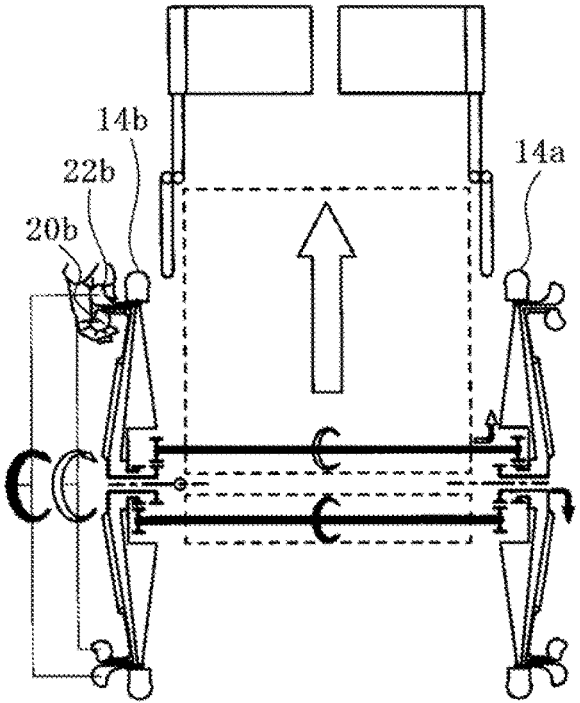
Figure 9C:
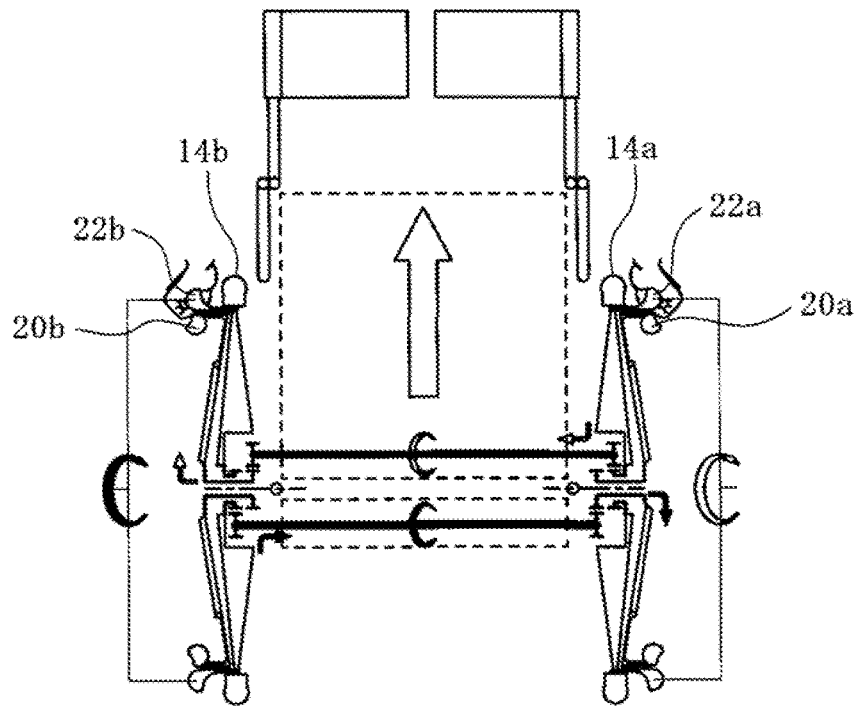

The operation of the wheelchair 10 will be described with reference to FIGS. 8A to 8D, and FIGS. 9A to 9C. FIG. 8A to 8D are schematic plan views showing the right or left turn driving of the wheelchair 10, and FIG. 9A to 9C are schematic plan views showing the straight driving of the wheelchair 10.

First, the right turn or left turn moving in the wheelchair 10 will be described. When attempting to turn right using the right hand, the first handrim 20a is grasped by the right hand and rotated forward (see FIG. 8A). Then, the rotational force of the first handrim 20a is transmitted to the second rotary shaft 34a via the inner shaft 36a, and then is transmitted to the outer shaft 38b via the shaft portion 34ab and the second rotary shaft 34b to rotate the left wheel 14b, so that the left wheel 14b is rotated in a state where the right wheel 14a is not rotated, and the wheelchair 10 turns right. When attempting to turn left using the right hand, the second handrim 22a is grasped by the right hand and rotated forward (see FIG. 8B). Then, the rotational force of the second handrim 22a is directly transmitted to the right wheel 14a, so that the right wheel 14a is rotated, and the wheelchair 10 turns left. When attempting to turn left using the left hand, the first handrim 20b is grasped by the left hand and rotated forward (see FIG. 8C). Then, the rotational force of the first handrim 20b is transmitted to the first rotary shaft 32b via the inner shaft 36b, and then is transmitted to the outer shaft 38a via the shaft portion 32ab and the first rotary shaft 32a to rotate the right wheel 14a, so that the right wheel 14a is rotated in a state where the left wheel 14b is not rotated, and the wheelchair 10 turns left. When attempting to turn right using the left hand, the second handrim 22b is grasped by the left hand and rotated forward (see FIG. 8D). Then, the rotational force of the second handrim 22b is directly transmitted to the left wheel 14b, so that the left wheel 14b is rotated, and the wheelchair 10 turns right. In summary, when attempting to turn to the side of the healthy hand (hand to be operated), the first handrims 20a and 20b may be operated. When attempting to turn to the opposite side of the healthy hand (hand to be operated), the second handrims 22a and 22b may be operated.

Next, the straight movement of the wheelchair 10 will be described. When attempting to move forward using the right hand, both the first handrim 20a and the second handrim 22a are grasped by the right hand and rotated forward (see FIG. 9A). Then, the rotational force of the first handrim 20a is transmitted to the second rotary shaft 34a via the inner shaft 36a, and then is transmitted to the outer shaft 38b via the shaft portion 34ab and the second rotary shaft 34b to rotate the left wheel 14b. Since the rotational force of the second handrim 22a rotates the right wheel 14a, the wheelchair 10 moves forward. When attempting to move forward with the left hand, both the first handrim 20b and the second handrim 22b are grasped by the left hand and are rotated forward (see FIG. 9B). Then, the rotational force of the first handrim 20b is transmitted to the first rotary shaft 32b via the inner shaft 36b, and then is transmitted to the outer shaft 38a via the shaft portion 32ab and the first rotary shaft 32a to rotate the right wheel 14a. Since the rotational force of the second handrim 22b rotates the left wheel 14b, the wheelchair 10 moves forward. In addition, it is possible to comfortably perform an uphill movement by changing two types of handrims with the right and left hands. That is, for example, the first handrim 20a and the second handrim 22a are first grasped by the right hand and are rotated forward to perform the uphill movement. In order to stop the operation, it is only necessary to hold both the first handrim 20a and the second handrim 22a with the right hand without rotating. Next, before the right hand is separated from the first handrim 20a and the second handrim 22a, both of the first handrim 20b and the second handrim 22b are grasped by the left hand and are rotated forward to perform the uphill movement. In this way, by changing the right and left hands and operating, unlike a conventional both-hands-operated wheelchair, it is possible to perform the uphill movement while resting according to the physical strength of the user. Furthermore, it can also move forward when using both hands (see FIG. 9C). In this case, the second handrim 22a is grasped and rotated forward by the right hand, and the second handrim 22b is grasped and rotated forward by the left hand.

Figure 10A:
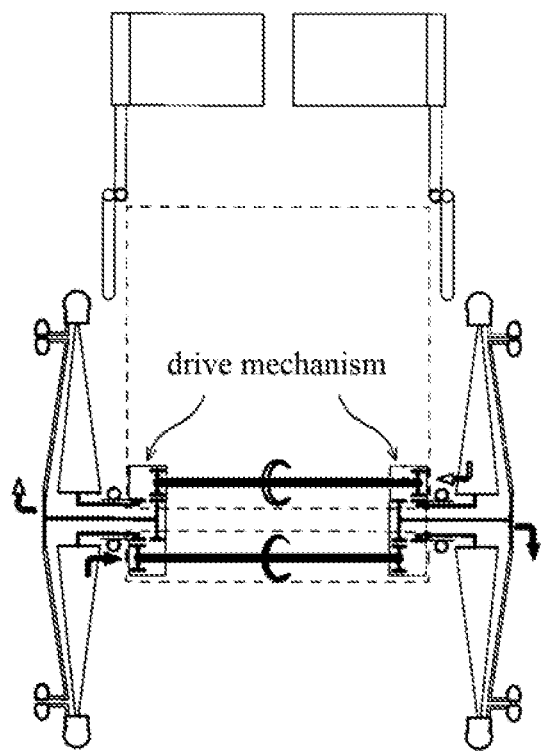
FIGS. 10A, 10B, and 10C are views showing modified examples of the location of right and left drive mechanisms of the wheelchair.
Figure 10B:
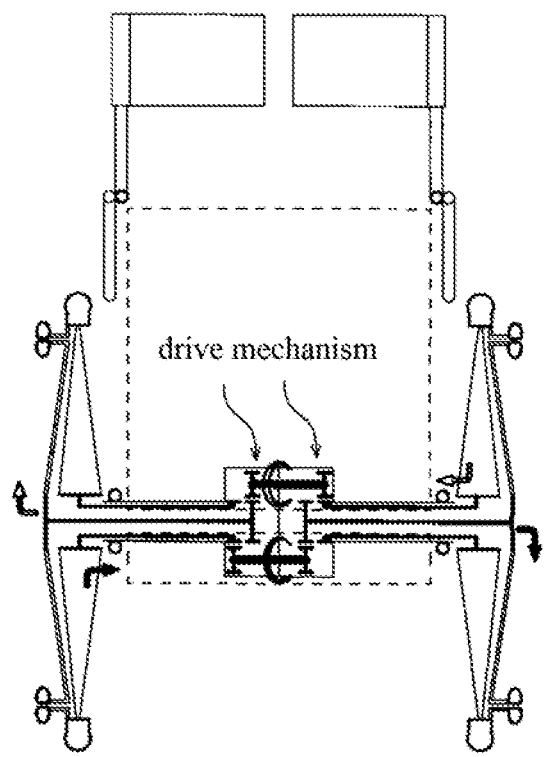
Figure 10C:
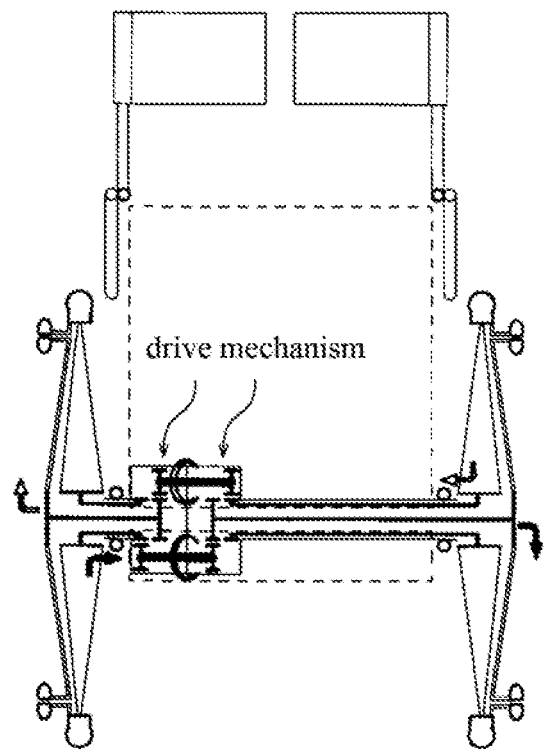

In the above, the drive mechanisms are shown as being disposed inside each of the wheel hubs 40a and 40b. However, the drive mechanism having the same function can be disposed in another appropriate location (for example, the right and left inner sides of the frame 12 (see FIG. 10A), the central portion of the frame 12 (see FIG. 10B), and the right or left side of the frame 12 (shown on the left side in FIG. 10C).

Figure 11:
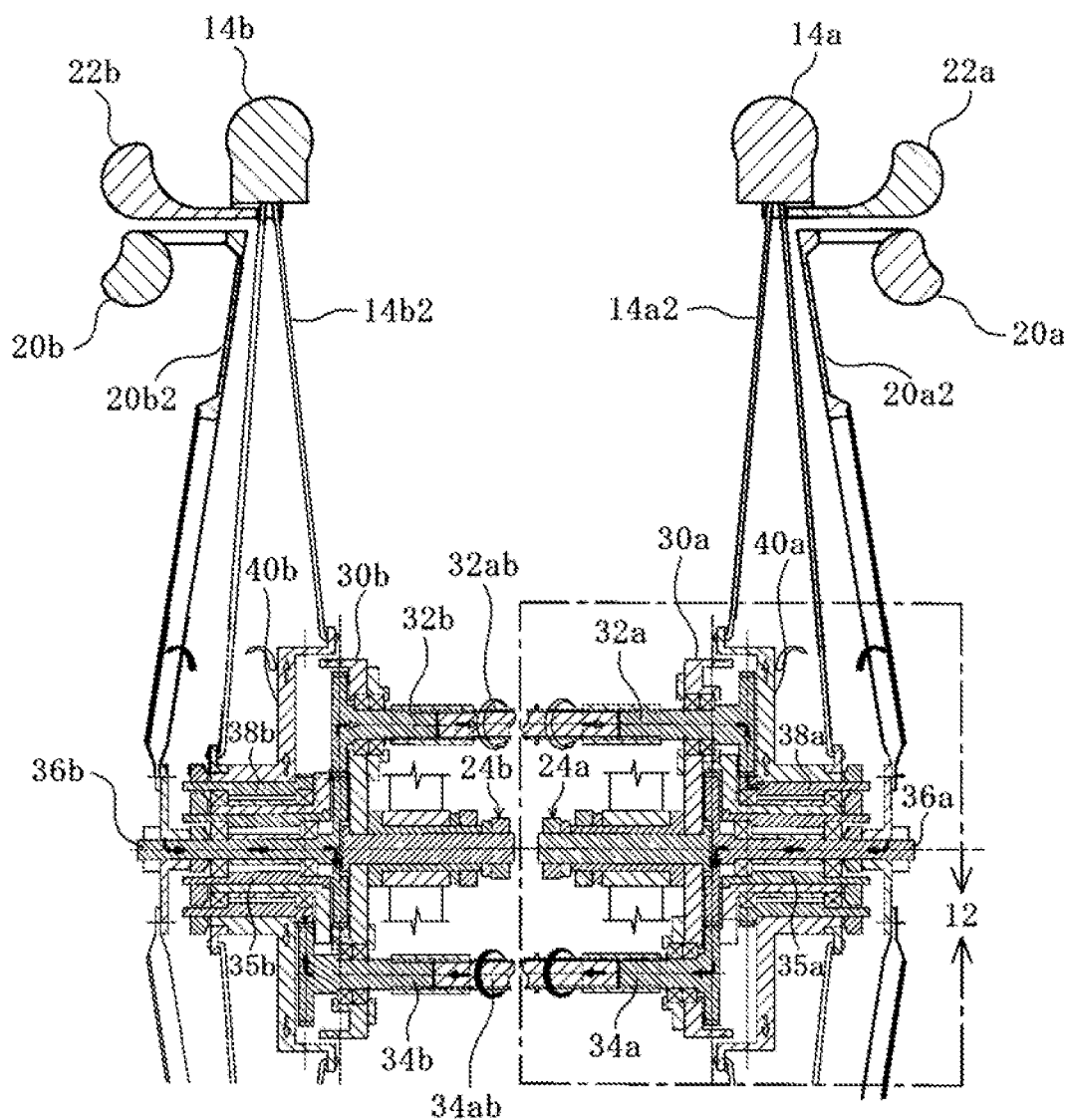
FIG. 11 is a view showing another configuration of right and left drive mechanisms of a wheelchair, corresponding to FIG. 4.
Figure 12:
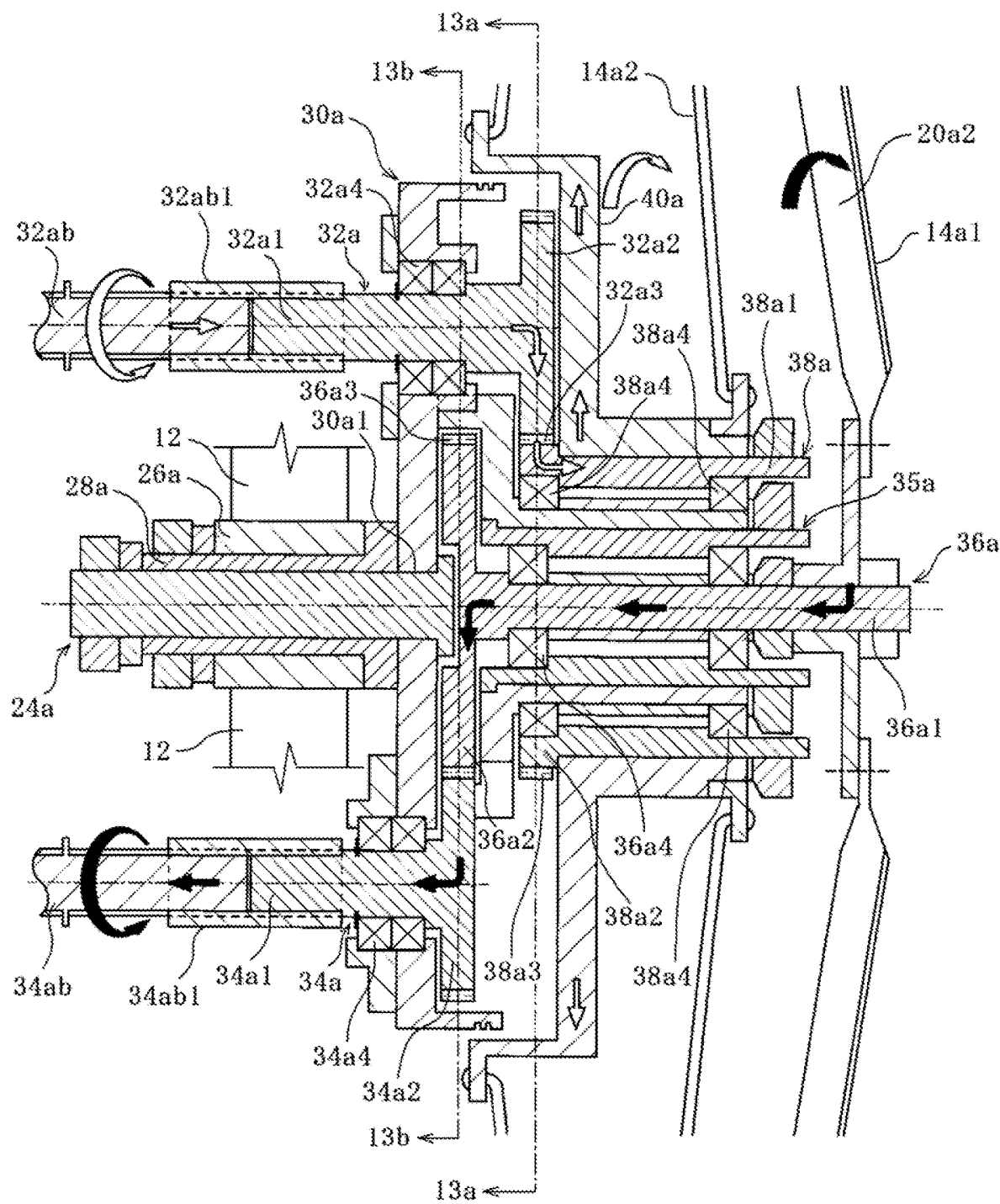
FIG. 12 is an enlarged cross-sectional view of a portion of 12 in FIG. 11.
Figure 13A:
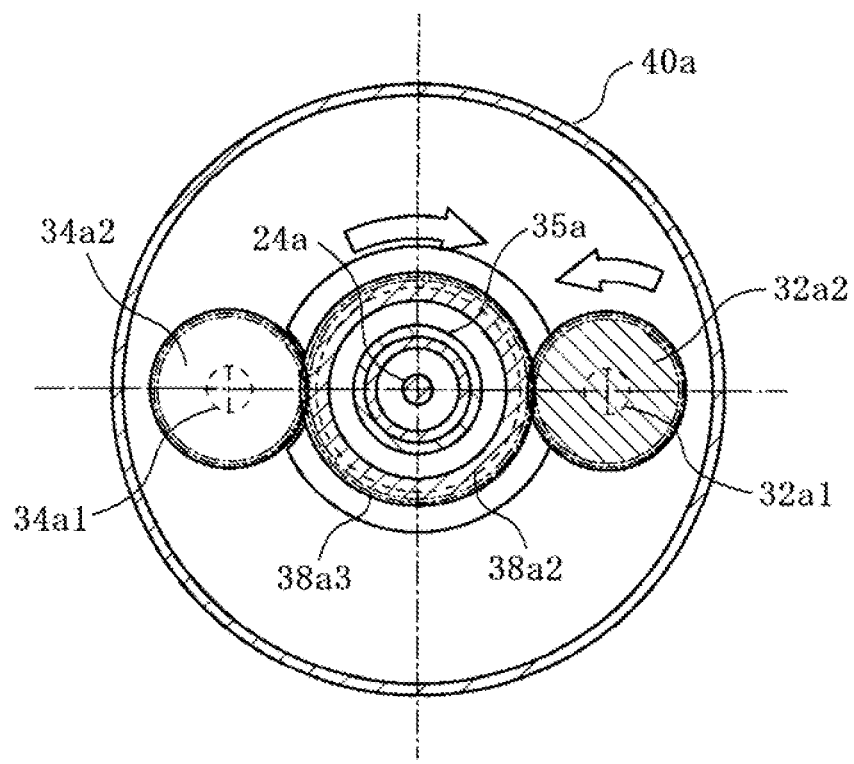
FIG. 13A is a view taken along line 13a-13a in FIG. 12.
Figure 13B:
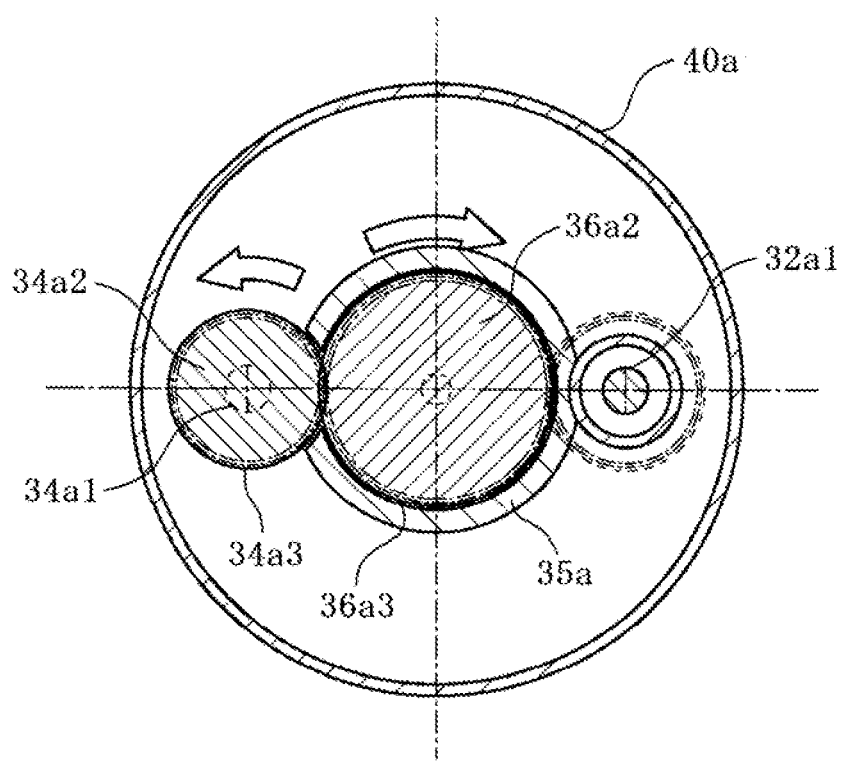
FIG. 13B is a view taken along line 13b-13b in FIG. 12.

FIGS. 11 to 13 show another configuration of right and left drive mechanisms of a wheelchair 10. That is, in the configuration shown in FIGS. 4 to 6, the inner shaft 36a is rotatably supported on the axle 24a, and the outer shaft 38a is rotatably supported on the inner shaft 36a. The configuration shown in FIGS. 11 to 13 differs from the configuration shown in FIGS. 4 to 6. In FIGS. 11 to 13, a shaft support housing 35a that supports both an inner shaft 36a and an outer shaft 38a is provided.

The following description focuses on the different points from the configuration shown in FIGS. 4 to 6 with reference to the drawings. An axle 24a is fitted into an opening 30a1 provided at a center of a circular disk 30a, but the axle 24a does not extend to the outward of the disk 30a, unlike the axle 24a shown in FIGS. 4 to 6. Configurations of a first rotary shaft 32a and a second rotary shaft 34a are the same as those shown in FIGS. 4 to 6. The cylindrical shaft support housing 35a is mounted to the outward of the disk 30a, so as to be concentric with the center of the axle 24a.

A shaft portion 36a1 of the inner shaft 36a is rotatably supported on the shaft support housing 35a by bearings 36a4, which are disposed on the inner surface of the shaft support housing 35a. The inner shaft 36a is different from the inner shaft 36a shown in FIGS. 4 to 6. The inner shaft 36a has the columnar shaft portion 36a1 located on the center line of the disk 30a, and the inner shaft 36a has a disk 36a2 provided at the inner end of the shaft portion 36a1. A first power transmission device (spur gear) 36a3 is provided on the outer periphery of the disk 36a2, and meshes with a second power transmission device (spur gear) 34a3 of a disk 34a2 of the second rotary shaft 34a. The inner shaft 36a is connected to handrim spokes 20a2, and the second rotary shaft 34a is rotated via the handrim spokes 20a2 and the inner shaft 36a by rotating a first handrim 20a. That is, a second rotational force generated by rotation of the right first handrim 20a is transmitted from the right inner shaft 36a to a left wheel 14b via the second rotary shaft 34a.

A shaft portion 38a1 of the outer shaft 38a is rotatably supported on the shaft support housing 35a by bearings 38a4, which are disposed on the outer surface of the shaft support housing 35a. The outer shaft 38a has the cylindrical shaft portion 38a1 and a disk 38a2 provided at the inner end of the shaft portion 38a1. A third power transmission device (spur gear 38a3) is provided on the outer periphery of the disk 38a2, and meshes with a fourth power transmission device (spur gear 32a3) of a disk 32a2 of the first rotary shaft 32a. The outer shaft 38a is connected to spokes 14a2 of a right wheel 14a. The right wheel 14a is rotated by rotating a second handrim 22a.

In the above description, the right side portion of the wheelchair 10 has been described, but the left side portion is basically the same as the right side portion.

In the configuration of the left side portion of FIG. 11, a left inner shaft 36b is rotatably supported on a shaft support housing 35b, so that the inner shaft 36b is different from the inner shaft 36b shown in FIG. 4. A fifth power transmission device (spur gear) is provided on the left inner shaft 36b, and meshes with a sixth power transmission device (spur gear) provided on a left side of a first rotary shaft 32b. The inner shaft 36b is connected to handrim spokes 20b2, and the first rotary shaft 32b is rotated via the handrim spokes 20b2 and the inner shaft 36b by rotating a first handrim 20b. That is, a first rotational force generated by rotation of the left first handrim 20b is transmitted from the left inner shaft 36b to the right wheel 14a via the first rotary shaft 32b.

A left outer shaft 38b is rotatably supported on the shaft support housing 35b. A seventh power transmission device (spur gear) is provided on the left outer shaft 38b, and meshes with an eighth power transmission device (spur gear) provided on the left side of a second rotary shaft 34b. The wheel hub 40b is fixed to the outer periphery of the outer shaft 38b, and is connected to the spokes 14b2 of the left wheel 14b. The left wheel 14b is rotated by rotating a second handrim 22b.

The configuration shown in FIGS. 11 to 13 is different from the configuration shown in FIGS. 4 to 6, because the inner shafts 36a and 36b do not rotatably support the load transmitted from the axle 24a and 24b to the outer shafts 38a and 38b. The rotational resistance of the inner shafts 36a and 36b is reduced, and the inner shafts 36a and 36b (and hence the first handrims 20a and 20b) can be operated more smoothly.

Figure 14:
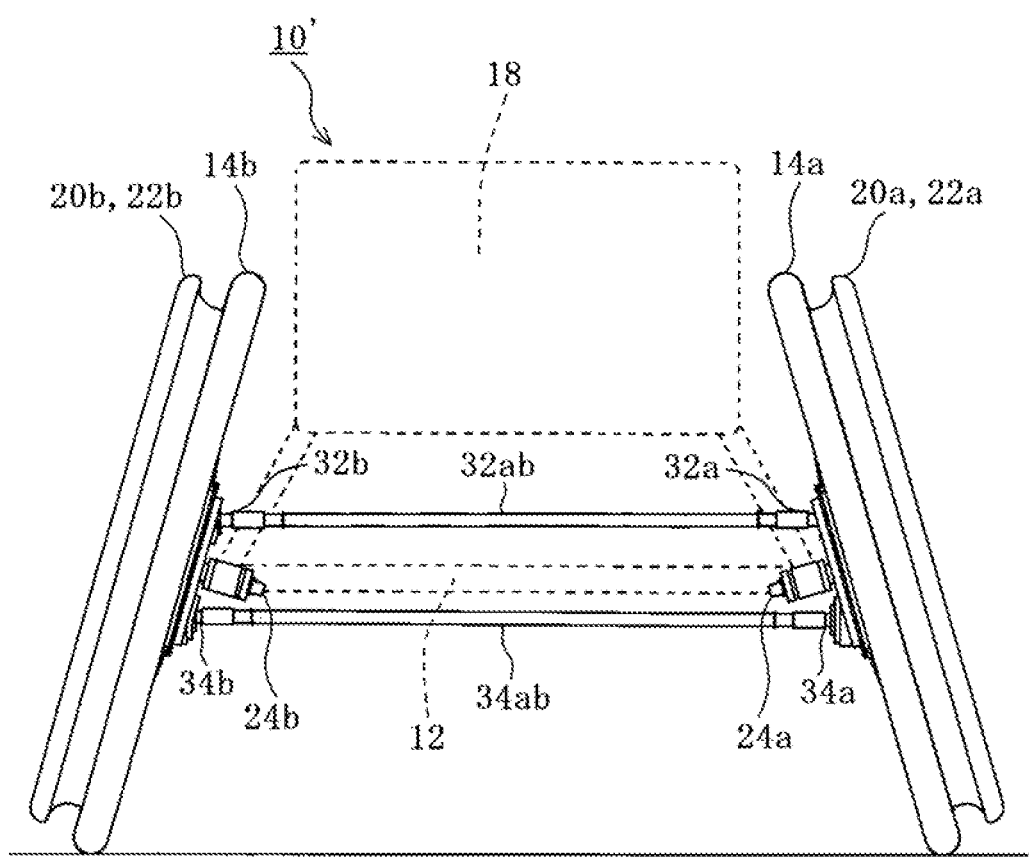
FIG. 14 is a rear view showing a sports-wheelchair.
Figure 15:
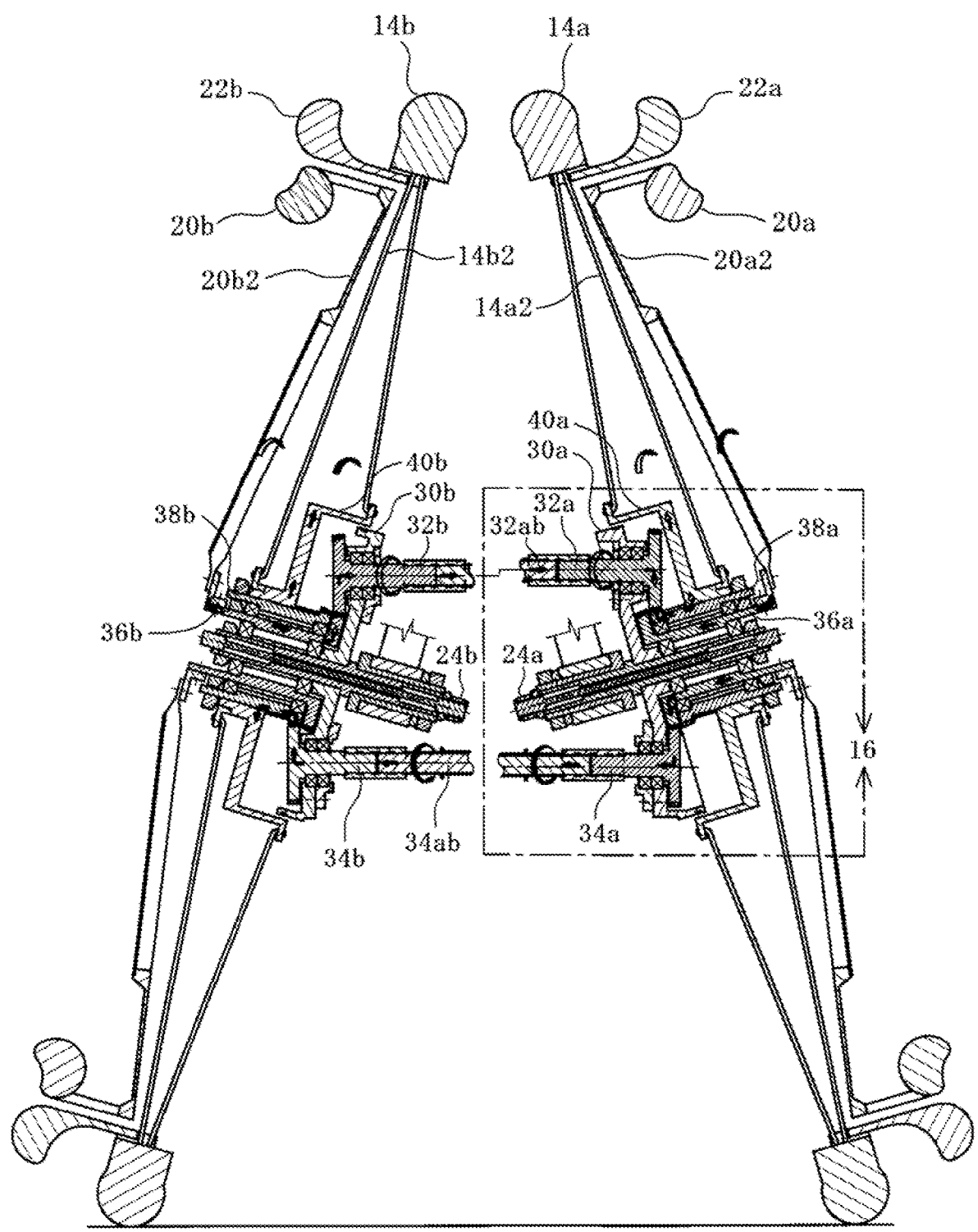
FIG. 15 is a view showing a configuration of right and left drive mechanisms of the sports-wheelchair of FIG. 14, corresponding to FIG. 4.
Figure 16:
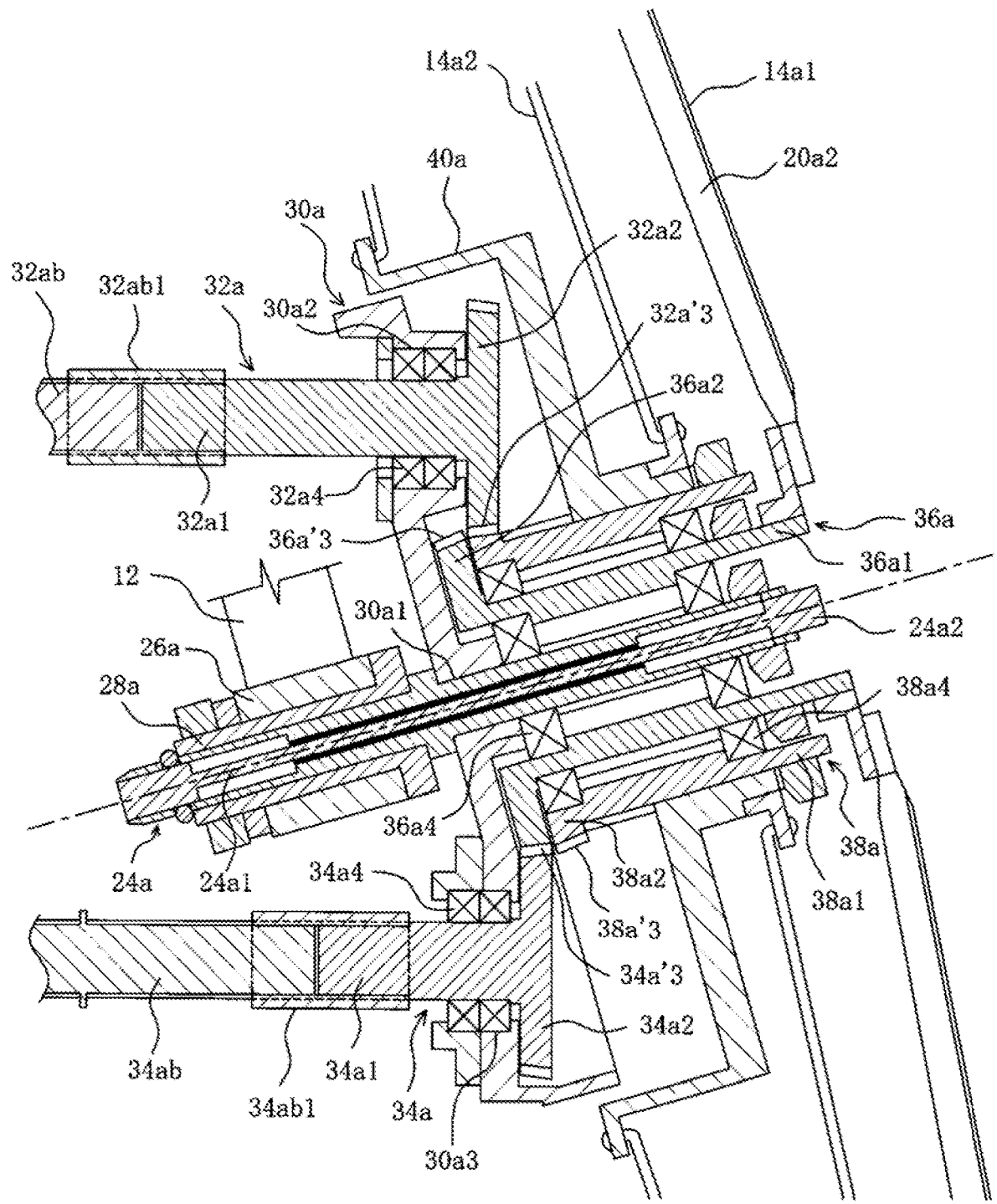
FIG. 16 is an enlarged cross-sectional view of a portion of 16 in FIG. 15.

The above-described wheelchair 10 is a so-called general wheelchair type, but the present invention can also be applied to a sports-wheelchair having a camber angle on wheels as shown in FIG. 14. FIG. 15 is a view showing a configuration of right and left drive mechanisms of a wheelchair 10' shown in FIG. 14, and FIG. 16 is an enlarged cross-sectional view of a portion of 16 in FIG. 15. The drive mechanisms of the wheelchair 10' shown in FIG. 15 are different from the drive mechanisms of the above-described wheelchair 10 using the spur gear as the power transmission device in that a bevel gear is used.

More specifically, with reference to FIGS. 15 and 16, the wheelchair 10' includes an axle 24a that rotatably supports a right wheel 14a. The axle 24a is mounted to a frame 12 via a mounting boss 26a. The axle 24a is fitted into an opening at a center of a disk 30a, and a first rotary shaft 32a and a second rotary shaft 34a are rotatably supported in openings 30a1 and 30a2 of the disk 30a. A fourth power transmission device (bevel gear) 32'a3 is provided on the first rotary shaft 32a, and a second power transmission device (bevel gear) 34'a3 is provided on the second rotary shaft 34a. A first power transmission device (bevel gear) 36'a3 is provided on an inner shaft 36a rotatably supported on the axle 24a, and meshes with the second power transmission device (bevel gear) 34'a3 of the second rotary shaft 34a. A third power transmission device (bevel gear) 38'a3 is provided on an outer shaft 38a rotatably supported on the inner shaft 36a, and meshes with the fourth power transmission device (bevel gear) 32'a3 of the first rotary shaft 32a. Then, the second rotary shaft 34a is rotated via handrim spokes 20a2 and the inner shaft 36a by rotating a first handrim 20a. That is, a second rotational force generated by rotation of the right first handrim 20a is transmitted from the right inner shaft 36a to a left wheel 14b via the second rotary shaft 34a. The right wheel 14a is rotated by rotating a second handrim 22a.

In the configuration of the left side portion of FIG. 15, a left inner shaft 36b is rotatably supported on an axle 24b, and a left outer shaft 38b is rotatably supported on the inner shaft 36b. A fifth power transmission device (bevel gear) is provided on the left inner shaft 36b, and meshes with a sixth power transmission device (bevel gear) provided on the left side of a first rotary shaft 32b. A seventh power transmission device (bevel gear) is provided on the outer shaft 38b, and meshes with an eighth power transmission device (bevel gear) provided on the left side of a second rotary shaft 34b. Then, the first rotary shaft 32b is rotated via handrim spokes 20b2 and the inner shaft 36b by rotating a first handrim 20b. That is, a first rotational force generated by rotation of the left first handrim 20b is transmitted from the left inner shaft 36b to the right wheel 14a via the first rotary shaft 32b. The left wheel 14b is rotated by rotating a second handrim 22b.

It is needless to say that the present invention is not limited to the above-described embodiments, various modifications can be made within the scope of the invention described in the claims, and these are also included in the scope of the present invention.

For example, the details of the components of the wheelchair shown are merely exemplary and these details may be modified.

DESCRIPTION OF THE REFERENCE NUMERALS 10, 10' wheelchair
12 frame
14a, 14b wheel
14a1, 14b1 wheel cover
14a2, 14b2 spoke
16a, 16b caster
18 seat
20a, 20b first handrim
20a1 recess
20a2, 20b2 handrim spoke
22a, 22b second handrim
22a1 recess
24a, 24b axle
26a mounting boss
28a mounting sleeve
30a, 30b disk
32a, 32b first rotary shaft
32a1, 32ab shaft portion
32a2 disk
32a3 fourth power transmission device (spur gear)
32'a3 fourth power transmission device (bevel gear)
32a4 bearing
34a, 34b second rotary shaft
34a1, 34ab Shaft portion
34a2 disk
34a3 second power transmission device (spur gear)
34'a3 second power transmission device (bevel gear)
34a4 bearing
35a, 35b shaft support housing
36a, 36b inner shaft
36a1 shaft portion
36a2 disk
36a3 first power transmission device (spur gear)
36'a3 first power transmission device (bevel gear)
36a4 bearing
38a, 38b outer shaft
38a1 shaft portion
38a2 disk
38a3 third power transmission device (spur gear)
38'a3 third power transmission device (bevel gear)
38a4 bearing
40a, 40b wheel hub

What is claimed is:

1. A wheelchair having a frame, a right wheel and a left wheel, a right caster and a left caster, and a seat, the wheelchair comprising:
a right-left pair of first handrims concentrically disposed with an axle of each wheel and respectively connected to handrim spokes;
a right-left pair of second handrims respectively connected to spokes of each wheel, concentrically disposed with the axle of each wheel, and having a larger diameter than the first handrim;
a first rotary shaft for transmitting a first rotational force generated by rotation of the left first handrim to the right wheel via right and left drive mechanisms; and
a second rotary shaft for transmitting a second rotational force generated by rotation of the right first handrim to the left wheel via the right and left drive mechanisms, wherein
the right and left drive mechanisms have a right-left pair of inner shafts connected to the handrim spokes and rotatably supported on the axle, and a right-left pair of outer shafts connected to the spokes and rotatably supported on the inner shaft,
a first power transmission device provided on the right inner shaft meshes with a second power transmission device provided on the right side of the second rotary shaft,
a third power transmission device provided on the right outer shaft meshes with a fourth power transmission device provided on the right side of the first rotary shaft,
a fifth power transmission device provided on the left inner shaft meshes with a sixth power transmission device provided on the left side of the first rotary shaft,
a seventh power transmission device provided on the left outer shaft meshes with an eighth power transmission device provided on the left side of the second rotary shaft,
the first rotational force is transmitted from the left inner shaft to the right wheel via the first rotary shaft, and
the second rotational force is transmitted from the right inner shaft to the left wheel via the second rotary shaft.

2. The wheelchair according to claim 1, wherein
the center line of the left first handrim and the center line of the left second handrim are disposed on the same plane, and
the center line of the right first handrim and the center line of the right second handrim are on the same plane.

3. The wheelchair according to claim 1, wherein
each of the power transmission devices is either a spur gear, a roller chain and a sprocket, or a toothed pulley and a toothed belt.

4. The wheelchair according to claim 1, wherein
each of the power transmission devices is a bevel gear.

5. A wheelchair having a frame, a right wheel and a left wheel, a right caster and a left caster, and a seat, the wheelchair comprising:
a right-left pair of first handrims concentrically disposed with an axle of each wheel and respectively connected to handrim spokes;
a right-left pair of second handrims respectively connected to spokes of each wheel, concentrically disposed with the axle of each wheel, and having a larger diameter than the first handrim;
a first rotary shaft for transmitting a first rotational force generated by rotation of the left first handrim to the right wheel via right and left drive mechanisms; and
a second rotary shaft for transmitting a second rotational force generated by rotation of the right first handrim to the left wheel via the right and left drive mechanisms, wherein
the right and left drive mechanisms have a cylindrical shaft support housing mounted to the frame so as to be concentric with the center of the axle, a right-left pair of inner shafts connected to the handrim spokes and rotatably supported by bearings disposed on the inner surface of the shaft support housing, and a right-left pair of outer shafts connected to the spokes and rotatably supported by bearings disposed on the outer surface of the shaft support housing,
a first power transmission device provided on the right inner shaft meshes with a second power transmission device provided on the right side of the second rotary shaft, a third power transmission device provided on the right outer shaft meshes with a fourth power transmission device provided on the right side of the first rotary shaft, a fifth power transmission device provided on the left inner shaft meshes with a sixth power transmission device provided on the left side of the first rotary shaft, a seventh power transmission device provided on the left outer shaft meshes with an eighth power transmission device provided on the left side of the second rotary shaft, the first rotational force is transmitted from the left inner shaft to the right wheel via the first rotary shaft, and the second rotational force is transmitted from the right inner shaft to the left wheel via the second rotary shaft.

6. The wheelchair according to claim 5, wherein the center line of the left first handrim and the center line of the left second handrim are disposed on the same plane, and the center line of the right first handrim and the center line of the right second handrim are on the same plane.

7. The wheelchair according to claim 5, wherein each of the power transmission devices is either a spur gear, a roller chain and a sprocket, or a toothed pulley and a toothed belt.

8. The wheelchair according to claim 5, wherein each of the power transmission devices is a bevel gear.

* * * * *